United States Patent [19]

Weber

[11] Patent Number: 4,526,773

[45] Date of Patent: Jul. 2, 1985

[54] SCRUBBING AND OXIDATION OF HYDROGEN SULFIDE WITH REMOVAL OF DISSOLVED OXYGEN FROM SCRUBBING SOLUTION BEFORE REUSE

[75] Inventor: Günter Weber, Linden, Fed. Rep. of Germany

[73] Assignee: Linde Aktiengesellschaft, Wiesbaden, Fed. Rep. of Germany

[21] Appl. No.: 551,311

[22] Filed: Nov. 14, 1983

Related U.S. Application Data

[63] Continuation-in-part of Ser. No. 406,804, Aug. 10, 1982, abandoned.

[30] Foreign Application Priority Data

Apr. 30, 1982 [DE] Fed. Rep. of Germany ....... 3216161

[51] Int. Cl.³ .................. C01B 17/05; B01D 53/34
[52] U.S. Cl. .................. 423/573 R; 423/224; 423/226
[58] Field of Search .............. 423/224, 226, 573 G, 423/573 R

[56] References Cited

U.S. PATENT DOCUMENTS

| | | | |
|---|---|---|---|
| 2,641,527 | 6/1953 | Leutz | 423/573 R |
| 3,642,448 | 2/1972 | Beavow | 423/573 R |
| 4,113,553 | 9/1978 | Samuelson | 423/573 R X |
| 4,125,597 | 11/1978 | Fleck | 423/573 R |
| 4,243,648 | 11/1981 | Fenton | 423/571 |
| 4,400,361 | 8/1983 | Shafer | 423/226 |
| 4,434,143 | 2/1984 | Weber | 423/226 |
| 4,434,145 | 2/1984 | Weber | 423/226 |
| 4,434,146 | 2/1984 | Weber | 423/226 |

OTHER PUBLICATIONS

Brennstoffchemie, vol. 50, 1969, No. 4, pp. T24 and T25.
Kohl et al, "Gas Purification", 3rd Ed., 1979, Gulf Publishing Company, Houston, pp. 476–482.

*Primary Examiner*—Earl C. Thomas
*Attorney, Agent, or Firm*—Millen & White

[57] ABSTRACT

In a continuous process for the removal of $H_2S$ from a gaseous mixture involving: (a) simultaneous absorption and oxidation of $H_2S$ to form elemental sulfur; (b) regeneration of the oxidizing agent, e.g., vanadate, by treating the used scrubbing liquid with air; and (c) recycling the regenerated scrubbing liquid to the scrubbing step, to avoid the formation of sulfates and thiosulfates, the dissolved oxygen is substantially prevented from appearing in the scrubbing solution before reuse.

21 Claims, 1 Drawing Figure

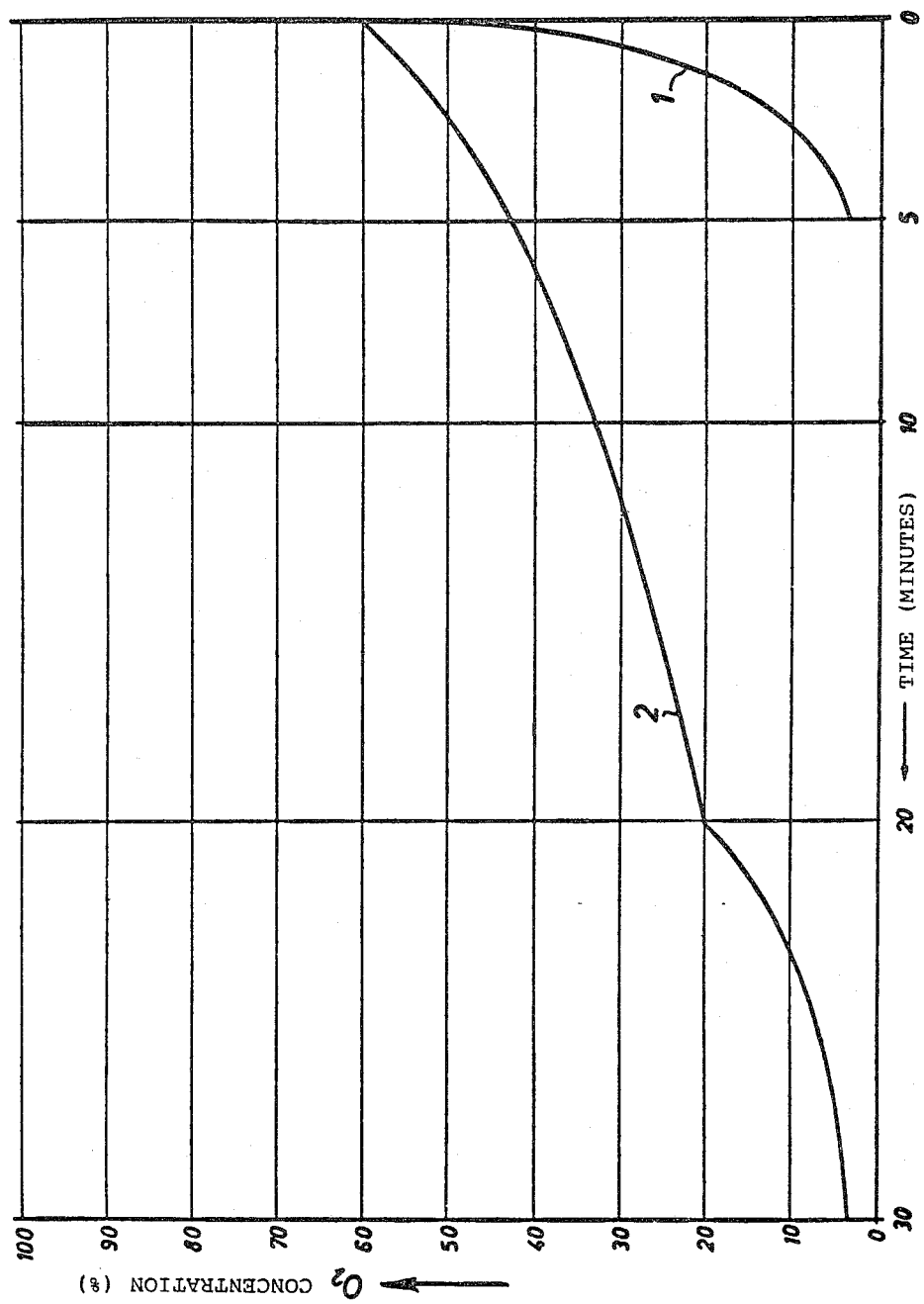

SCRUBBING AND OXIDATION OF HYDROGEN SULFIDE WITH REMOVAL OF DISSOLVED OXYGEN FROM SCRUBBING SOLUTION BEFORE REUSE

CROSS-REFERENCE TO RELATED APPLICATION

This application is a continuation in part of, "THE SCRUBBING OF HYDROGEN SULPHIDE USING pH CONTROL TO CONTROL THIOSULFATE FORMATION" by Guenter Weber, Ser. No. 406,804, filed Aug. 10, 1982, and now abandoned.

BACKGROUND OF THE INVENTION

This invention relates to a process for the removal of hydrogen sulfide from gaseous mixtures by scrubbing with an aqueous alkaline scrubbing solution containing an oxidizing agent. In particular, the hydrogen sulfide is absorbed from the scrubbing solution and oxidized principally to elementary sulfur; the resultant scrubbing solution containing the oxidizing agent in a reduced valent state is regenerated in a downstream oxidizer by treatment with an oxygen-containing gas; and the resultant scrubbing stream containing reoxidized oxidizing agent, after the removal of elementary sulfur, is then recycled to the scrubbing column. (The sulfur may alternatively be removed prior to the oxidizing step.)

A process of this type is known, for example, from Brennstoffchemie (Fuel Chemistry), Volume 50, 1969, No. 4, pages T24 and T25. According to the process described in this reference, the hydrogen sulfide is initially bound by the alkali as a hydrogen sulfide and then reacts with the oxidizing agent, with liberation of sulfur and reduction of the oxidizing agent. The oxidizing agent is preferably a salt of anthraquinonedisulfonic acid and/or five-valent vanadium; and other oxidizing agents can also be used, such as, for example, salts of iron, copper, chromium, nickel, cobalt or manganese. In order to reactivate the solution, air is blown through the oxidizer. The reduced oxidizing agent is then oxidized, and simultaneously, the sulfur floats to the surface of the solution and collects there as a scum. The supernatant sulfur is drawn off, filtered and then autoclaved.

The oxidation of the hydrogen sulfide, e.g., NaHS, occurs extremely rapidly, so that hardly any hydrogen sulfide reaches the oxidizer; thus the main condition for the formation of thiosulfate, which is observed in other processes, is almost eliminated. Nevertheless, even in this process, so much thiosulfate as well as sulfate are still formed that, due to their great solubility in the scrubbing solution, a buildup of thiosulfate in particular occurs which interferes with the efficiency of the scrubbing solution.

It has already been recognized by Beavon in U.S. Pat. No. 3,642,448 that the cause of the formation of thiosulfate and sulfate can be attributed to the presence of oxygen in the scrubbing solution. This depends on the fact that, after the oxidation of the scrubbing solution, dissolved oxygen reaches the scrubbing column and therein can form sulfate or thiosulfate with the hydrogen sulfide. To solve the problem, Beavon teaches the incorporation of an additional stage comprising stripping the oxygen from the absorption solution prior to contacting the latter with $H_2S$. See also Fleck U.S. Pat. No. 4,125,597 for another mass transfer technique to remove oxygen. Conversely, if the concentration of oxidizing agent, e.g., five-valent vanadium, in the scrubbing step does not satisfy the stoichiometric quantity required for the content of hydrogen sulfide, non-oxidized hydrogen sulfide reaches the downstream oxidizer therein to form thiosulfate and sulfate by-products.

SUMMARY OF THE INVENTION

An object of the present invention is to provide an improved process of the type mentioned above whereby the formation of sulfates and thiosulfates during the simultaneous absorption and oxidation of $H_2S$ is avoided in a simple and cost-effective manner.

Upon further study of the specification and appended claims, further objects and advantages of this invention will become apparent to those skilled in the art.

These objects are achieved according to the invention substantially preventing the presence of residual dissolved oxygen in the scrubbing solution before it is recycled to the scrubbing column.

Thus, it is necessary for an efficient overall process on the one hand to achieve complete oxidation of the sulfur moiety to sulfur prior to the scrubbing stream reaching the oxidizer, and on the other hand to substantially prevent the presence of dissolved oxygen in the recycle scrubbing stream before it enters the scrubbing column. By substantially preventing the presence of dissolved oxygen is meant that there is permitted a residual quantity of oxygen of preferably not more than 1 ppm, especially not more than 0.1 ppm oxygen in the scrubbing stream which enters the scrubbing column.

According to this invention, the formation of the by-products is avoided by exhausting the oxygen in the oxidizer wherein the oxygen is reacted with reduced oxidizing agent. For this purpose, the system is operated so that the reoxidation of the oxidizing agent is incomplete. Whereas in this way, only a part of the oxidizing agent contained in the scrubbing solution is reoxidized, the presence of some of the reduced oxidizing agent in the scrubbing stream leaving the oxidizer can act as a scavenger for any oxygen present. In general, only about 60–95%, preferably about 70–85% of the reduced oxidizing agent is oxidized so that a sufficient amount of scavenger will be available.

The process according to our invention is cheaper than the known processes by Beavon or Fleck because there is no need for a large residence vessel to strip out the dissolved oxygen. Furthermore, we do not need any stripping medium, as e.g. $N_2$ or $CO_2$. A further advantage of the new process is that the residence time in the oxidizer will become reduced. As a consequence the oxidizer itself can be reduced in size.

In an extension of the concept of the invention, the total scrubbing solution can be subjected to incomplete reoxidation. For this purpose, the pH of the scrubbing solution can be decreased, preferably by passing in $CO_2$. The $CO_2$ can thereby be fed into the oxidizer, for example, together with the oxygen-containing gas. However, the $CO_2$ can also be introduced into the scrubbing solution at any other desired point.

Another embodiment for conducting incomplete reoxidation is provided by decreasing the residence time of the scrubbing solution in the oxidizer. This can be achieved by increasing the flow rate of scrubbing solution through the oxidizer or, by alternatively, decreasing the size of the oxidizer volume.

Another embodiment comprises maintaining the temperature of the scrubbing solution such that only incomplete reoxidation is achieved under the given operating conditions of the oxidizer (loading, pH, residence time).

Where operating conditions are used to achieve incomplete oxidation, routine experimentation is required to provide the optimum required degree of incompleteness. Process conditions in the art, e.g., residence time, pH, composition of absorption solution, gas to be treated, temperature, etc., are so interdependent and subject to variation that it is not possible to give absolute values for general cases. Instead, a chemical engineer, using conventional process control technology, will be able to provide a specific process with such operating conditions as to result in a degree of reoxidation of the reduced oxidizing agent of only 60-95% preferably 70-85%.

Still another embodiment comprises dividing the total scrubbing solution into two partial streams; conducting a complete reoxidation of the reduced oxidizing agent with only one partial stream, e.g., 80% of the total, and recombining the subsequent two partial streams. It is preferred in the embodiment that not more than 80% of the total four-valent vanadium or equivalent reduced oxidizing agent is oxidized.

The maximum concentration of the reduced oxidizing agent available for reaction with oxygen is limited by the fact that in order to avoid precipitation, the solubility of reduced oxidizing agent in the scrubbing solution should not be exceeded. If, due to this limitation, the concentration of reduced oxidizing agent is not sufficient for the reaction with oxygen, the reduced oxidizing agent must be maintained in solution by adding agents to the scrubbing solution, such as complexing agents, for example, citric acid, tartaric acid, etc.

BRIEF DESCRIPTION OF DRAWING

The attached drawing is a graph, wherein the dissolved oxygen concentration is plotted as the ordinate against time as the abscissa, with each of curves 1 and 2 representing a different percentage of reoxidation of the four-valent vanadium in the oxidizer.

DETAILED DESCRIPTION OF DRAWING

At a degree of reoxidation of four-valent vanadium of 80% (curve 1), the oxygen dissolved in the scrubbing solution after oxidation ($O_2$-saturated scrubbing solution, about 60% $O_2$) is reacted substantially completely with the remaining four-valent vanadium in about 5 minutes, so that, after a residence time of 5 minutes after oxidation, the scrubbing solution is substantially free of dissolved oxygen, i.e., a residual content of oxygen of about 0.1 ppm.

In contrast, if the degree of reoxidation of vanadium is 97% (curve 2) under conditions which are otherwise the same, the oxygen concentration is decreased to only about 20% after about 20 minutes, as a result of the reaction of the very low concentration of four-valent vanadium still present. As can be seen from the figure, the oxygen concentration can then be reduced to approximately 0 by subsequent stripping with $N_2$, but this comprises an additional stage.

The preferred embodiment to accomplish insufficient reoxidation of reduced vanadium resides in reducing the residence time of the scrubbing solution in the oxidizes.

Crude gaseous mixtures treated by the present invention should be lean in oxygen; i.e., should contain not more than about 3 volume percent of oxygen, preferably being free of oxygen.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever. In the following examples, all temperatures are set forth uncorrected in degrees Celsius; unless otherwise indicated, all parts and percentages are by weight.

EXAMPLE 1

A scrubbing solution was used containing 1.5 g vanadium per liter, 3 g anthraquinonedisulfonic acid per liter, 30 g NaSCN per liter, and 20 g carbonate per liter. At a pH between 8.0 and 8.5, about 75% of the reduced oxidizing agent was reoxidized. During a residence time of about 5 minutes of the solution after oxidation, the oxygen dissolved in the scrubbing solution is reacted with the remaining four-valent vanadium. In the resultant scrubbing solution entering the scrubbing column, no detectable formation of thiosulfate could be found after more than 500 hours of operation.

EXAMPLE 2

An oxidative, wet-scrubbing $H_2S$ recovery process was operated for nearly 1000 hours with a washing solution of the following composition (make-up):

$Na_2CO_3$: 20 g/l
V: 1.5 g/l
MDEA: 50 g/l
NaSCN: 20 g/l

The feed gas contained about 98% Vol% $CO_2$ and 2 Vol% $H_2S$. Therefore, the pH of the scrubbing liquid after absorption of $H_2S$ (i.e., before entering the oxidizer) was very low (about 7.6), which results in a complete conversion of $H_2S$ to S. The residence time of the scrubbing liquid in the oxidizer was 35 minutes for the first 650 hours of operation, this residence time being enough to reach a complete reoxidation of reduced vanadium.

During this period the formation rate of $Na_2S_2O_3$ was about 0.17 g per liter a day in spite of the low liquor pH.

Afterwards, the residence time in the oxidizer was reduced to about 20 minutes, which reduced the degree of reoxidation to about 80%. All other conditions remained constant. The rate of $Na_2S_2O_3$ formation became zero.

The preceding examples can be repeated with similar success by substituting the generically or specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. In a process for the removal of hydrogen sulfide from a gaseous mixture comprising:
   (a) scrubbing said gaseous mixture with an aqueous alkaline scrubbing solution containing an oxidizing agent, whereby the sulfide of the hydrogen sulfide is oxidized principally to elementary sulfur, with the simultaneous reduction of the oxidizing agent to a lower valence state;

(b) regenerating resultant scrubbing solution in a downstream oxidizer comprising introducing an oxygen-containing gas into the scrubbing solution to form dissolved oxygen which reoxidizes the reduced oxidizing agent;

(c) removing elementary sulfur from the scrubbing medium; and (d) recycling resultant sulfur-diminished and reoxidized scrubbing medium to said scrubbing step (a);

the improvement which comprises conducting step (b) so that the reduced oxidizing agent is oxidized to only 60–85% thereof, resulting in residual reduced oxidizing agent, the latter functioning as a scavenger for any oxygen present to substantially prevent the presence of residual dissolved oxygen in the scrubbing solution recycled to the scrubbing step (a).

2. A process according to claim 1 wherein the reduced oxidizing agent is oxidized in step (b) to the extent of only 70–85%.

3. A process according to claim 1, wherein the total scrubbing solution is subjected to incomplete reoxidation.

4. A process according to claim 1, wherein the pH of the scrubbing solution in the oxidizer is decreased to effect incomplete oxidation.

5. A process according to claim 4, wherein the pH is decreased by passing in $CO_2$ in the oxidizer.

6. A process according to claim 5, wherein the $CO_2$, together with oxygen-containing gas, is fed into the oxidizer.

7. A process according to claim 1, wherein the residence time of the scrubbing solution in the oxidizer is not more than about 20 minutes.

8. A process according to claim 1, wherein the temperature of the oxidizing scrubbing solution in the oxidizer is maintained lower than is necessary for complete oxidation.

9. A process according to claim 1, wherein the scrubbing solution is divided into two partial streams, only one partial stream being completely reoxidized, the two partial streams subsequently being recombined.

10. A process according to claim 1, wherein the oxidizing agent comprises five-valent vanadium.

11. A process according to claim 1, wherein less than 1 ppm of oxygen is present in the scrubbing stream recycled to the scrubbing step (a).

12. A process according to claim 1, wherein less than 0.1 ppm of oxygen is present in the scrubbing stream recycled to the scrubbing step (a).

13. A process according to claim 4, wherein the residence time of the scrubbing solution in the oxidizer is not more than about 20 minutes.

14. A process according to claim 5, wherein the residence time of the scrubbing solution in the oxidizer is not more than about 20 minutes.

15. A process according to claim 7, wherein the temperature of the oxidizing scrubbing solution in the oxidizer is maintained lower than is necessary for complete oxidation.

16. A process according to claim 4, wherein the temperature of the oxidizing scrubbing solution in the oxidizer is maintained lower than is necessary for complete oxidation.

17. A process according to claim 13, wherein the temperature of the oxidizing scrubbing solution in the oxidizer is maintained lower than is necessary for complete oxidation.

18. A process according to claim 14, wherein the temperature of the oxidizing scrubbing solution in the oxidizer is maintained lower than is necessary for complete oxidation.

19. A process according to claim 1, wherein the scrubbing solution is essentially free of a vanadium-boron complex capable of oxidizing HS ions to produce elemental sulfur.

20. A process according to claim 1, wherein the scrubbing solution contains essential amounts of anthraquinonedisulfonic acid.

21. A process according to claim 20, wherein $CO_2$ is passed into the oxidizer, the residence time in the oxidizer is not more than about 20 minutes and the temperature is maintained lower than is necessary for complete oxidation.

* * * * *